No. 619,671. Patented Feb. 14, 1899.
E. K. CHAPMAN & G. B. RUBENS.
SWIVEL DISPLAY FASTENER.
(Application filed Feb. 17, 1898.)

(No Model.)

WITNESSES:
L. E. Snow.
C. Chambers.

GEORGE B. RUBENS,
AND
EDWARD K. CHAPMAN.
INVENTORS

BY
J. H. Snow.
ATTORNEY.

UNITED STATES PATENT OFFICE.

EDWARD K. CHAPMAN AND GEORGE B. RUBENS, OF INDIANAPOLIS, INDIANA.

SWIVEL DISPLAY-FASTENER.

SPECIFICATION forming part of Letters Patent No. 619,671, dated February 14, 1899.

Application filed February 17, 1898. Serial No. 670,665. (No model.)

*To all whom it may concern:*

Be it known that we, EDWARD K. CHAPMAN and GEORGE B. RUBENS, citizens of the United States, residing at Indianapolis, in the county of Marion and State of Indiana, have invented a new and useful improvement in a swivel connection between a snap and hook in a swivel display-fastener, of which the following is a specification.

Our invention relates to display-fasteners such as are ordinarily used in show-windows or any place where goods are displayed for securing various kinds of merchandise to bars or rods, so the goods may be held up to view. With the common fastener now in use with a snap at one end and a hook at the other end the merchandise cannot be turned at an angle, but remains on a rigid parallel line with the bar or rod on which the hook is hung. With our improved fastener the hook is put over the bar and the snap secured to the article to be displayed, and the article can then be turned at any angle desired by means of the swivel hereinafter more fully described.

Figure 3:
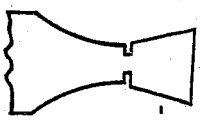
Figure 4:
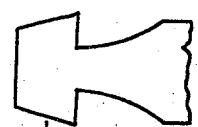
Figure 2:
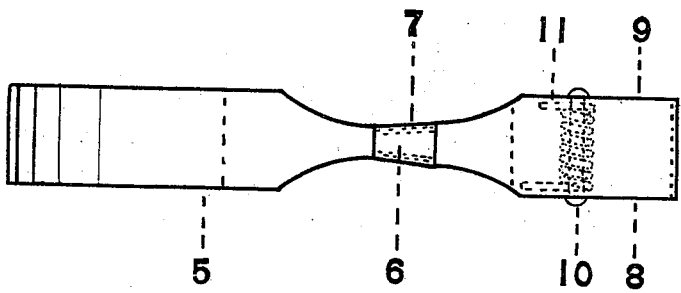
Figure 1:
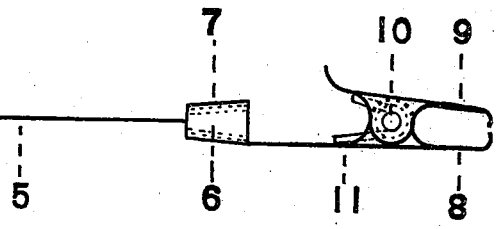

In the drawings, Figure 1 is a side view of the fastener. Fig. 2 is a front view of the fastener. Fig. 3 is a view of the hook before it is formed to fit in the end of the snap. Fig. 4 is a view of the end of the snap before it is formed to fit over the end of the hook.

Similar numerals of reference indicate corresponding parts in all the figures of the drawings.

5 designates the hook part of the fastener. 6 designates the end of the hook, which is cut larger at the outer end, so that when it is formed into a round roll it will be cone-shaped or larger at the outer end. 7 designates the end of the snap, which is also cut larger at the inner end, so that when it is formed into a roll or cone-shaped it is larger at the inner end to receive the end 6 of the hook part, and thus form a swivel-joint to hold the end of the hook.

8 designates the lower half of the snap.
9 designates the upper half of the snap.
10 designates the pin that passes through the upper and lower halves of the snap and secures them together.
11 designates the spring that closes the snap.

The operation of the swiveled or revolving fastener is as follows: When the hook 5 is hooked over a bar or rod, the snap may be turned at any angle desired by means of the swivel connecting the snap to the hook. The swivel is formed by cutting the end of the hook in the shape shown in Fig. 3 and then forming it into a cone shape, which leaves the outer end larger than the inner round surface, and the end of the snap is cut in the shape shown in Fig. 4 and is formed cone-shaped also and fits the end of the hook, thus forming a snug swivel.

It will be observed that the construction of the two cones is such that not only can they turn with respect to each other, but also their frictional contact is such that the weight of the article supported by the clasp will retain the lower portion of the device in any position that it may be placed relative to the hook.

Having thus described our invention, what we claim, and desire to secure by Letters Patent, is—

1. As an article of manufacture, a display-fastener consisting of two parts terminating in cones at adjacent ends, one cone fitted within the other, with their smaller ends in corresponding positions and the larger end of the inner cone having greater diameter than the smaller end of the outer cone, one part of the fastener having suspending means and the other part constructed to have the article to be displayed attached thereto.

2. As an article of manufacture, a display-fastener consisting of two parts, each having a cone on the adjacent ends, one cone constructed to fit and inclose the other having open ends so that an endwise movement of one cone with respect to the other is possible, a sustaining means on the upper end of one part and a fastening device on the lower end of the other part, the said sustaining means, the fastening device and cones all disposed in a common axis.

In testimony that we claim the foregoing as our own we have hereunto affixed our signatures in the presence of two witnesses.

EDWARD K. CHAPMAN.
GEORGE B. RUBENS.

Witnesses:
FRANCES HARPER,
HENRY LOVE.